United States Patent [19]

Durbut et al.

[11] Patent Number: 5,035,826
[45] Date of Patent: Jul. 30, 1991

[54] LIQUID CRYSTAL DETERGENT COMPOSITION

[75] Inventors: Patrick J. Durbut, Verviers; Myriam M. Mondin, Seraing; Guy J. Broze, Grace-Hollogne, all of Belgium

[73] Assignee: Colgate-Palmolive Company, Piscataway, N.J.

[21] Appl. No.: 411,280

[22] Filed: Sep. 22, 1989

[51] Int. Cl.⁵ .................. C11D 9/32; C11D 9/22; C11D 17/08

[52] U.S. Cl. .................. 252/121; 252/132; 252/173; 252/174.11; 252/174.12; 252/174.21; 252/174.22; 252/174.24; 252/DIG. 1; 252/DIG. 14; 252/DIG. 12

[58] Field of Search .......... 252/173, 557, 174.21, 252/174.22, 170, 171, DIG. 1, DIG. 14, DIG. 15, DIG. 19, 121, 132, 174.11, 174.12, 174.24, DIG. 12

[56] References Cited

U.S. PATENT DOCUMENTS

| | | | |
|---|---|---|---|
| 4,659,497 | 4/1987 | Akred | 252/DIG. 14 |
| 4,767,625 | 8/1988 | Mitsuno | 252/174.22 |
| 4,869,842 | 9/1989 | Denis | 252/DIG. 14 |

FOREIGN PATENT DOCUMENTS

2190681 11/1987 United Kingdom .

*Primary Examiner*—Paul Lieberman
*Assistant Examiner*—Kevin McCarthy
*Attorney, Agent, or Firm*—Bernard Lieberman; Murray M. Grill; Robert C. Sullivan

[57] ABSTRACT

A liquid detergent composition which is in liquid crystal form comprises a synthetic organic surface active agent, as the detergent component, which preferably includes one or more nonionic detergents of the ethoxylated higher fatty alcohol type, and a lesser proportion of anionic or cationic surfactant, such as sodium dialkyl sulfosuccinate or dicoco dimethyl ammonium chloride, a cosurfactant, such as tripropylene glycol butyl ether, a solvent for the soil, such as an isoparaffin of 9 to 11 carbon atoms or methyl cocoate (ester of methyl alcohol and coco acids) and water, with the water usually being the major component. Such compositions are useful for cold or room temperature cleaning of lipophilic soils, such as animal fats, from hard surfaces and from fabrics, and may be used as pre-treatments to loosen such soils from substrates to facilitate easier cleaning of dishes and laundry with conventional or the invented detergent compositions.

19 Claims, 2 Drawing Sheets

LIQUID CRYSTAL DETERGENT COMPOSITION

This invention relates to a liquid crystal detergent composition. More specifically, it is of a liquid detergent composition in liquid crystal state or form, which by virtue of its liquid crystal nature and ready convertibility to a microemulsion when brought into contact with oily soil, is superior to other liquid detergent compositions in detergency and in other physical properties.

Liquid aqueous synthetic organic detergent compositions have long been employed for human hair shampoos and as dishwashing detergents for hand washing of dishes (as distinguished from automatic dishwashing machine washing of dishes). Liquid detergent compositions have also been employed as hard surface cleaners, as in pine oil liquids, for cleaning floors and walls. More recently they have proven successful as laundry detergents too, apparently because they are convenient to use, are instantly soluble in wash water, and may be employed in "pre-spotting" applications to facilitate removals of soils and stains from laundry upon subsequent washing. Liquid detergent compositions have comprised anionic, cationic and nonionic surface active agents, builders and adjuvants, including, as adjuvants, lipophilic materials which can act as solvents for lipophilic soils and stains. The various liquid aqueous synthetic organic detergent compositions mentioned serve to emulsify lipophilic materials, including oily soils, in aqueous media, such as wash water, by forming micellar dispersions and emulsions.

Although emulsification is a mechanism of soil removal, it has been only comparatively recently that it was discovered how to make microemulsions which are much more effective than ordinary emulsions in removing lipophilic materials from substrates. Such microemulsions are described in British Patent Specification No. 2,190,681 and in U.S. patent applications Ser. Nos. 06/866,029; 07/085,902; 07/120,250; and 07/267,872, most of which relate to acidic microemulsions useful for cleaning hard surfaced items, such as bathtubs and sinks, which microemulsions are especially effective in removing soap scum and lime scale from them. However, as in U.S. patent application Ser. No. 07/267,872, the microemulsions may be essentially neutral and such are also taught to be effective for microemulsifying lipophilic soils from substrates. In U.S. patent application Ser. No. 07/313,664 there is described a light duty microemulsion liquid detergent composition which is useful for washing dishes and removing greasy deposits from them in both neat and diluted forms. Such compositions include complexes of anionic and cationic detergents as surface active components of the microemulsions.

The various microemulsions referred to include a lipophile, which may be a hydrocarbon, a surfactant, which may be an anionic and/or a nonionic detergent(s), a co-surfactant, which may be a poly-lower alkylene glycol lower alkyl ether, e.g., tripropylene glycol monomethyl ether, and water.

Although the manufacture and use of detergent compositions in microemulsion form significantly improves cleaning power and greasy soil removal, compared to the usual emulsions, the present invention improves them still further and also increases the capacity of the detergent compositions to adhere to surfaces to which they have been applied. Thus, they drip or run substantially less than cleaning compositions of "similar" cleaning power which are in microemulsion or normal liquid detergent form. Also, because they form microemulsions with lipophilic soil or stain material spontaneously, with essentially no requirement for addition of any energy, either thermal or mechanical, they are more effective cleaners at room temperature and at higher and lower temperatures that are normally employed in cleaning operations than are ordinary liquid detergents, and are also more effective than detergent compositions in microemulsion form.

The present liquid crystal detergent compositions may be either clear or somewhat cloudy or milky (lactescent) in appearance but both forms thereof are stable on storage and components thereof do not settle out or become ineffective, even on storage at somewhat elevated temperatures for periods as long as six months and up to a year. The presence of the cosurfactant in the liquid crystal detergent compositions helps to make such compositions resist freezing at low temperatures. Another advantage of the present invention, in another aspect of it, is that the invented liquid crystal detergent compositions can be produced from more concentrated microemulsions by dilution with water, without the addition of any significant amount of energy, and such concentrates, being in microemulsion form, are also stable on storage. Thus, if desired, the concentrate may be marketed to save shipping costs and storage space, and the consumer may effect the dilution (or may employ the concentrate directly).

In accordance with the present invention a liquid detergent composition, suitable at room temperature or colder, for pre-treating and cleaning materials soiled with lipophilic soil, is in liquid crystal form or is capable of being diluted with water and thereby being converted to liquid crystal form, and comprises a synthetic organic surface active agent, a cosurfactant, a solvent for the soil, and water. The invention also relates to processes for treating items and materials soiled with lipophilic soil, with compositions of this invention, to loosen or remove such soil, by applying to the locus of such soil on such material a soil loosening or removing amount of an invented composition. The invention is also in converting a concentrated liquid detergent composition of the invention, normally in microemulsion form, to a liquid crystal composition by addition of water thereto and halting the water addition when the formula of the diluted detergent is in in the liquid crystal range (as it appears on a water-oil-surfactant/cosurfactant phase diagram). In another aspect of the invention lipophilic soil is absorbed from the soiled surface into the liquid crystal, and such absorption converts the liquid crystal to microemulsion form, or after such absorption of the lipophilic soil the liquid crystal is converted to microemulsion form by further addition of water.

The nonionic and ionic surfactants and synthetic organic detergents that are employed in the invented cleaning compositions are preferably water soluble but such materials that are water dispersible can also be used. The soluble nonionic compounds are usually condensation products of an organic aliphatic or alkylaromatic hydrophobic compound and a lower alkylene oxide, such as ethylene oxide, which is hydrophilic. Almost any hydrophobic compound having a carboxy, hydroxy, amido or amino group with a free hydrogen present can be condensed with ethylene oxide or with polyethylene glycol to form a nonionic detergent. The length of the polyethenoxy chain of the condensation product can be adjusted to achieve the desired balance between the hydrophobic and hydrophilic elements (hydrophilic-lipophilic balance, or HLB).

Particularly suitable nonionic detergents are the condensation products of a higher aliphatic alcohol, such as a fatty alcohol, containing about 8 to 18 or 20, more preferably 8 to 12 carbon atoms, in a straight (or branched) chain configuration, condensed with about 2 to 30, preferably 2 to 10, and more preferably 2 to 6 and most preferably 2.5 to 5 moles of ethylene oxide. Particularly preferred such compounds are $C_{9-11}$ alkanol ethoxylates offive moles of ethylene oxide per mole (5 EtO), which also may be designated as $C_{9-11}$ alcohol EO 5:1, and $C_{9-11}$ alkanol ethoxylates of 2.5 moles of ethylene oxide per mole ($C_{9-11}$ alcohol EO 2.5:1), and mixtures thereof. Narrow range ethoxylates (NRE's) of similar types may be used instead of the described broad range ethoxylates (BRE's).

Other suitable nonionic detergents are the polyethylene oxide condensates of one mole of alkyl phenol containing from about 6 to 12 carbon atoms in a straight- or branched-chain configuration, with about 2 to 30, preferably 2 to 15 moles of ethylene oxide, such as nonyl phenol condensed with 9 moles of ethylene oxide, dodecyl phenol condensed with 15 moles of ethylene oxide, and isooctyl phenol condensed with 15 moles of ethylene oxide. These aromatic compounds are not as desirable as the aliphatic alcohol ethoxylates in the invented compositions because they are not as biodegradable.

Another well known group of usable nonionic detergents is marketed under the trade name "Pluronics". These compounds are block copolymers formed by condensation of ethylene oxide with a hydrophobic base formed by the condensation of propylene oxide with propylene glycol. The molecular weight of the hydrophobic portion of the molecule is of the order of 950 to 4,000, preferably 1,200 to 2,500. The condensation of ethylene oxide with the hydrophobic moiety increases the water solubility of the hydrophobe. The molecular weight of these polymers is in the range of 1,000 to 15,000, and the polyethylene oxide content may comprise 20 to 80% thereof.

Still other satisfactory nonionic detergents are condensation products of a $C_{8-16}$ alkanol with a heteric mixture of ethylene oxide and propylene oxide. The mole ratio of ethylene oxide to propylene oxide is from 1:1 to 4:1, preferably from 1.5:1 to 3.0:1, with the total weight of the ethylene oxide and propylene oxide contents (including the terminal ethanol group or propanol group) being from 60% to 85%, preferably 70% to 80%, of the molecular weight of the nonionic detergent. The higher alkanol may contain 9 or 11 to 12 or 15 carbon atoms and one such nonionic detergent is the condensation product of $C_{13-15}$ alkanol with 4 moles of propylene oxide and 7 moles of ethylene oxide, which is available from BASF Corp. under the trade name Plurafac LF400.

Also suitable for incorporation in the invented cleaning compositions are the nonionic detergents that are derived from the condensation of ethylene oxide with the product resulting from the reaction of propylene oxide and ethylene diamine For example, satisfactory such compounds contain from about 40 to 80% of polyoxyethylene by weight, have a molecular weight of from about 5,000 to 11,000, and result from the reaction of ethylene oxide with a hydrophobic base which is a reaction product of ethylene diamine and excess propylene oxide, which base is of a molecular weight in the range of 2,500 to 3,000.

Additionally, polar nonionic detergents may be substituted for the generally non-polar nonionic detergents described above. Among such polar detergents are those in which a hydrophilic group contains a semipolar bond directly between two atoms, for example, N--O and P--O. There is charge separation between such directly bonded atoms, but the detergent molecule bears no net charge and does not dissociate into ions. Suitable such polar nonionic detergents include open chain aliphatic amine oxides of the general formula $R^7$-$R^8$-$R^9$N--O, wherein $R^7$ is an alkyl, alkenyl or monohydroxyalkyl radical of about 10 to 16 carbon atoms and $R^8$ and $R^9$ are each selected from the group consisting of methyl, ethyl, propyl, ethanol, and propanol radicals. Preferred amine oxides are the $C_{10-16}$ alkyl dimethyl and dihydroxyethyl amine oxides, e.g., lauryl dimethyl amine oxide and lauryl myristyl dihydroxyethyl amine oxide. Other operable polar nonionic detergents are the related open chain aliphatic phosphine oxides having the general formula $R^{10}R^{11}R^{12}$P--O wherein $R^{10}$ is an alkyl, alkenyl or monohydroxyalkyl radical of a chain length in the range of 10 to 18 carbon atoms, and $R^{11}$ and $R^{12}$ are each alkyl or monohydroxyalkyl radicals containing from 1 to 3 carbon atoms. As with the amine oxides, the preferred phosphine oxides are the $C_{10-16}$ alkyl dimethyl and dihydroxyethyl phosphine oxides.

The anionic surface active agents (or surfactants) will preferably be detergents and will normally include a lipophilic anionic moiety or plurality of moieties of relatively high molecular weight, usually more than 100, which lipophile(s) will preferably be or will include one or more alkyl or alkenyl groups of at least six carbon atoms, such as 6 or 8 to 12 or 18 carbon atoms, which are preferably alkyls. Such anionic detergent will also usually include a neutralized sulfonic, sulfuric or carboxylic acid group and preferably will include a neutralized sulfonic or sulfuric acid group (a neutralized carboxylic acid group may also be present in such detergents), with the cation thereof preferably being alkali metal, ammonium or triethanolamine, such as sodium, potassium, ammonium or triethanolamine.

Examples of operative anionic surfactants include sodium dioctyl sulfosuccinates [di-(2-ethylhexyl) sodium sulfosuccinate being one] and corresponding dihexyl and didecyl esters; sodium dodecylbenzene sulfonate; sodium linear tridecylbenzene sulfonate; sodium lauryl sulfate; triethanolamine lauryl sulfate; sodium cocoalkyl sulfate; sodium ethoxylated higher fatty alcohol sulfate, which will usually be of 1 to 20 ethylene oxide groups per mole, such as sodium lauryl monoethoxy ether sulfate, sodium lauryl diethoxy ether sulfate and sodium $C_{12-14}$ alkyl triethoxy ether sulfate; sodium $C_{14-17}$ paraffin sulfonate; sodium olefin sulfonate (of 10 to 20 carbon atoms in the olefin); and sodium cocomonoglyceride sulfate. These act to improve product stability at high temperatures.

The preferred sulfosuccinic acid ester salts are esters of aliphatic alcohols, such as saturated alkanols of 4 to 12 carbon atoms (preferably 6 to 10, e.g., about 8) and are normally diesters of such alkanols. More preferably such are alkali metal salts of the diesters of alcohols of 6 to 10 carbon atoms and most preferably the diesters will be of octanol, such as 2-ethyl hexanol, and the sulfonic acid salt will be the sodium salt.

As with the other ionic surfactants, the anionic surfactants, the cationic surfactants useful in the present invention, also preferably with the nonionic detergent, will be of detersive properties, and it is considered that such ionic surfactants also improve and stabilize the liquid crystal state of the phase diagram liquid crystals at normal use temperatures, such as 25–50° C. Preferable among such cationic surfactants are quaternary ammonium salts, in which at least one higher molecular weight group and two or three lower molecular weight groups are linked to a common nitrogen atom to produce a cation, and wherein the electrically balancing anion is a halide, acetate, nitrite or lower alkosulfate, such as bromide, chloride or methosulfate. The higher molecular weight substituent(s) on the nitrogen is/are often (a) higher alkyl group(s), containing 10 or 12 to 18 or 20 carbon atoms and the lower molecular weight substituents may be lower alkyl of 1 to 4 carbon atoms, such as methyl and ethyl, which may be substituted, as with hydroxy, in some instances. One or more of said substituents may include an aryl moiety or may be replaced by an aryl, such as benzyl or phenyl. Among the possible lower molecular weight substituents are also lower alkyls of 1 to 4 carbon atoms, such as methyl and ethyl, substituted by poly-lower alkoxy moieties, such as polyethoxy moieties, bearing a hydroxyl end group, and being of the general formula $R(X)_nOH$ wherein R is $C_{1-4}$ alkyl bonded to the nitrogen, X is $CH_2CH_2O$ or $CH(CH_3)CH_2)$, and n is from 1 to 20. Alternatively, one or two of such lower poly-lower alkoxy moieties, having terminal hydroxyls, may be directly bonded to the quaternary nitrogen instead of being bonded to it through the previously mentioned lower alkyl.

Among the useful quaternary ammonium halide surfactants are dilauryl dimethyl ammonium chloride, dimyristyl diethyl ammonium chloride, di-tallowalkyl dimethyl ammonium chloride, lauryl trimethyl ammonium chloride and cetyl trimethyl ammonium bromide, with the di-higher alkyl substituted compounds being preferred over those which are only mono-higher alkyl substituted.

In addition to the cationic compounds previously mentioned, other suitable cationic surfactants include the imidazolinium salts, such as 2-heptadecyl-1-methyl-1-[(2-stearoylamido) ethyl]-imidazolinium chloride; the corresponding methosulfate compound; 2-methyl-1-(2-hydroxyethyl)-1-benzyl imidazolinium chloride; and 2-heptadecyl-1-(hydroxyethyl)-1-octadecyl imidazolinium ethyl sulfate. Generally, the imidazolinium salts of preference will be halides (preferably chlorides) and lower alkosulfates, and may include hydroxy-lower alkyl substituents.

Preferably, the nonionic detergent will be accompanied by either an anionic or a cationic surfactant, preferably a detergent, with the amount of such ionic surfactant being less than that of the nonionic detergent, which lesser proportion is sufficient to stabilize the liquid crystal at room temperature and at higher and lower temperatures, such as from 10 to 50° C.

The cosurfactant of the present liquid crystal compositions, which significantly aids in the formations of such liquid crystals and microemulsions, is preferably a monoalkyl ether of a lower glycol or polyalkylene glycol of the formula $RO(X)_nH$, wherein R is $C_{1-5}$ alkyl, X is $CH_2CH_2O$ or $CH(CH_3)CH_2)$, and n is from 1 to 5, or a monoalkyl ester of the formula $R^1O(X)_nH$, wherein $R^1$ is $C_{2-4}$ acyl and X and n are as immediately previously described. In the formula given X is preferably a propoxy group and n is preferably 2 or 3, more preferably 3.

Other amphiphiles may be substituted for the named cosurfactants, such as those of 1 to 10 carbon atoms, which include a hydrogen-heteroatom bond, with the heteroatom being of an electronegativity above 2.5 units. The amphiphile usually includes an —OH, —NH$_2$, —COOH or —CONH$_2$ radical, and some examples of such cosurfactants are of 3 to 9 carbon atoms, corresponding to the glycol ethers named below, with NH$_2$, CONH$_2$ and COOH replacing the free hydroxyls. Satisfactory glycol ethers and other glycol derivatives include tripropylene glycol mono-n-butyl ether, dipropylene glycol mono-n-butyl ether, dipropylene glycol isobutyl ether, pentapropylene glycol monobutyl ether, propylene glycol tertiary butyl ether, diethylene glycol mono-n-butyl ether (butyl carbitol), ethylene glycol mono-butyl ether (butyl cellosolve), tetraethylene glycol monobutyl ether, propylene glycol monoacetate and dipropylene glycol propionate. Of the cosurfactants those which are preferred are the mono-lower alkyl ethers (of 3 to 6, preferably 4 carbon atoms in such alkyls) of monoto penta-propylene glycols, preferably the normal butyl ethers, and most preferably tripropylene glycol mono-n-butyl ether (although the corresponding dipropylene compound is also very satisfactory).

The organic solvent component of the present liquid crystals includes solvents for the soils, which solvents may have polar properties, often in minor proportions, but the preferred organic solvent is lipophilic and is a suitable oil, such as a non-polar oil, which is preferably a hydrocarbon of 6 to 16 carbon atoms. Such hydrocarbon is desirably a normal paraffin or an isoparaffin, and of these those which are saturated and of 7 to 13 carbon atoms are preferred, with isoparaffins of 8 to 12 carbon atoms being more preferred. The best are the $C_{9-11}$ isoparaffins (which average such numbers of carbon atoms. Such materials are available commercially from Exxon Corp. under the trade name Isopar H. In addition to such hydrocarbons, terpenes and similar perfume materials may be employed, as described in British Patent Specification No. 2,190,681. Other useful hydrocarbons are heptane, octane and nonane but also included are those of cyclic structure, such as cyclohexane. Among other solvents that are useful are the lower ($C_{1-6}$) alkyl esters of higher ($C_{10-18}$) carboxylic acids, such as methyl gocoate, and/or the higher ($C_{10-18}$) alkyl esters of lower ($C_{1-6}$) acids, such as lauryl propionate. Such compounds may be considered as representative of the groups of useful oils of polar properties, and are useful solvents in the invented compositions because of their similarity in structure to the fats and oils that are to be removed from substrates by the invented compositions.

The last of the components of the invented liquid crystal compositions is water and deionized water is preferably the form used, although tap waters may also be employed, too, preferably of a hardness not in excess of 150 p.p.m., as CaCO$_3$.

In addition to the recited components of the compositions of the present invention there may also be present adjuvant materials for dishwashing, laundering and other detergency applications, which materials may include: foam enhancing agents, such as lauric myristic diethanolamide; foam supressing agents (when desired), such as silicones, higher fatty acids, and higher fatty acid soaps; preservatives and antioxidants, such as formalin and 2,6-ditert. butyl-p-cresol; pH adjusting agents, such as sulfuric acid and sodium hydroxide; perfumes, colorants (dyes and pigments); and opacifying or pearlescing agents, if desired. In addition to the mentioned adjuvants, sometimes it may be desirable to include water soluble metal salts, such as chlorides and sulfates of magnesium and aluminum, to react with the anionic detergent to convert it to such a metal salt, which may improve performance of the invented composition. Such salts normally work best at acidic or neutral pH's when they are present in the invented compositions.

In broad terms, the proportions of the components of the present liquid detergent compositions, in liquid crystal form, are a detersive proportion of synthetic organic surface active agent, a cosurfactant proportion of the cosurfactant, a proportion of solvent sufficient to help remove lipophilic soil from substrates, and enough water to place the composition within the liquid crystal area of its phase diagram and to act as the continuous medium for the oil-in-water microemulsion to be formed from the liquid crystal during use. Preferred ranges of proportions of the synthetic organic surfactant(s) are 5 to 40%, preferably 10 to 25% and more preferably 10 to 15%. Of the total surfactant content the proportion of ionic surfactant, either anionic or cationic, will be relatively small, normally being within the range of 2 to 25% of the amount of nonionic detergent present, preferably 3 to 10% thereof. Preferably, the surfactant components of the invented liquid crystal compositions will be nonionic and anionic detergents, in mixture, and in such mixture the nonionic detergent will be about 6 to 35% of the composition, preferably 10 to 15% thereof and the anionic detergent will be 0.3 to 5% of the composition, more preferably 0.5 to 2% thereof. A most preferred content of nonionic detergent will be about 12.5% and it will be a mixture of about 10% (or 9.9%) of an nonionic detergent which is more hydrophilic, and about 2.5% of a nonionic detergent which is less hydrophilic (degrees of ethoxylation of 5 and 2.5, respectively).

The cosurfactant content in the liquid crystal compositions is normally in the range of 0.5 to 20%, preferably being 2 to 15% and more preferably being 5 to 10%, e.g., about 7%. For the purpose of the plotting of the phase diagram of the invented compositions the surfactants and cosurfactant(s) will be considered together as one component, with the water and the solvent being the other two. The amount of cosurfactant will normally be about 5 or 10 to 50% of the sum of the amounts of surfactants and cosurfactant, with the sum of the surfactants and cosurfactant amounts or percentages being about 5 or 10 to 60% of the composition. Preferred such percentages are 20 to 45% and 10 to 40%, respectively, with more preferred percentages being 30 to 40% and 15 to 25%, respectively.

The solvent content of the liquid crystal compositions will normally be 1 to 20% thereof, preferably 2 to 10% and more preferably 3 to 7%, e.g., about 5%, and the water content will normally be in the range of about 40 to 90%, preferably 50 to 85% and more preferably 60 to 80%, e.g., 75%. Adjuvants, which are optional components, will normally not exceed 15% of the composition and will preferably not include any non-enzymatic materials having molecular weights above 5,000 (because such high molecular weight compounds interfere with the preparation of the present compositions and their maintenance in the liquid crystal state). Enzymes, which may have such higher molecular weights, can be tolerated in the detergent compositions but normally the proportion of enzyme will be held to no more than 2% and preferably will be less than 1% of the composition to avoid any interference with the liquid crystal. The total proportion of adjuvants will be in the range of 0 to 15%, preferably 0 to 10%, more preferably 0 to 5%, and most preferably will be no more than 2%.

The concentrates of this invention, which upon dilution with up to three parts of water, preferably from 0.25 to 2 parts, per part of concentrate, result in creation of a liquid crystal, are of compositions determined by the previously recited proportions of components for the liquid crystal compositions, and the dilution to be effected. Of course, the concentrates will contain less water but the relative proportions (not percentages) of the other components will be kept in the same ranges as previously recited. The concentrates will usually be in microemulsion form and when the requisite amount of water is added to them, will be spontaneously converted to liquid crystals. Because of the previous recitations of proportions of components in the liquid crystal compositions and the evident relationship between the compositions of the concentrates and the liquid crystal detergent compositions made from them it is not considered to be necessary to recite here specific ranges of proportions for usual, preferred, more preferred and most preferred compositions. Such are readily calculable from the corresponding percentages given for the desired liquid crystal detergent. However, such concentrated liquid detergent composition, which is in microemulsion form and which will yield a liquid crystal upon dilution with water, not exceeding three parts of water per part of the concentrated composition, comprises a nonionic detergent, preferably with an anionic detergent, a cosurfactant which is an organic amphiphile of 1 to 10 carbon atoms that includes a hydrogen-heteroatom bond, with the heteroatom being of an electronegativity above 2.5 units, a lipophilic solvent and water. A specific preferred concentrated liquid detergent composition comprises about 12.5 parts of nonionic detergent (preferably a mixture of two such detergents of different formulas and hydrophilicities with both being of a higher fatty alcohol of 9 to 11 carbon atoms condensed with 2 to 6 moles of ethylene oxide, about 0.7 part of sodium $C_{6-10}$ dialkyl sulfosuccinate, about 7 parts of tripropylene glycol lower alkyl monoether, wherein the lower alkyl is of 3 to 6 carbon atoms, about 5 parts of paraffin or isoparaffin of an average of 9 to 11 carbon atoms, 0 to 5 parts of adjuvants and up to 50% of the concentrated composition of water, with the proportion of water preferably being in the range of 5 to 40% and more preferably 10 to 30%. For example, a concentrate containing 60% of surfactant-cosurfactant system of the type described (nonionic detergent/sulfosuccinate/tripropylene glycol n-butyl ether), 15% of isoparaffin and 25% of water, when diluted with two parts of water per part of concentrate, will be converted from microemulsion form, during dilutio first to a cloudy or turbid liquid crystal and thence to a clear liquid crystal, with the final composition analysis being 20% of the surfactant-cosurfactant system, 5% of the isoparaffin and 75% of water.

The phase transformations between concentrates and liquid crystals, and between liquid crystals and microemulsions resulting from use of the invention, and the variations in formulas of compositions within the invention which are in liquid crystal state, are easily ascertainable and the invention is readily understood when reference is made to this specification, including the working examples thereof, taken in conjunction with the drawing, in which.

Figure 1:
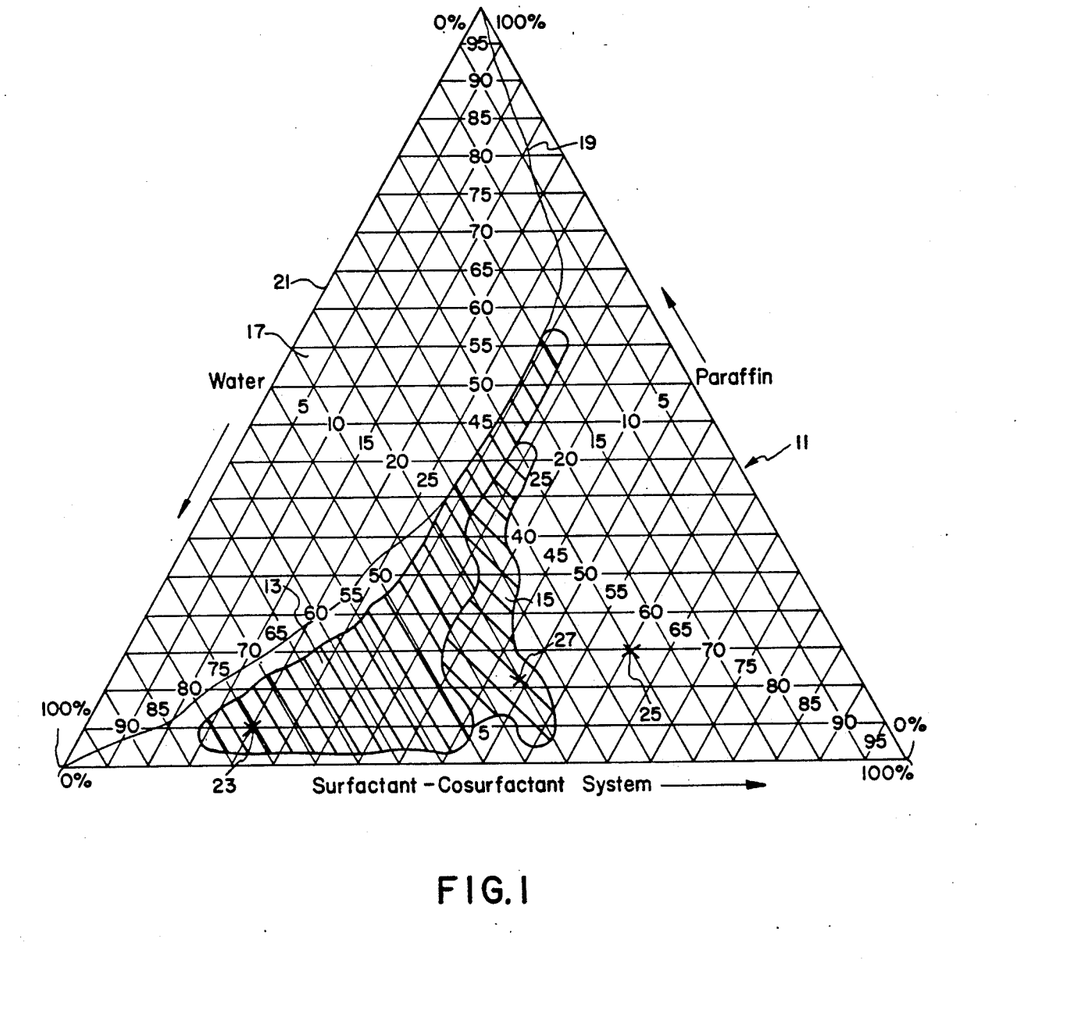
FIG. 1 is a phase diagram, showing both clear and turbid liquid crystal composition areas for preferred compositions of this invention, in which the cosurfactant is tripropylene glycol n-butyl ether, the surfactants include higher fatty alcohol condensates with ethylene oxide, as nonionic detergent(s), and sodium dioctyl sulfosuccinate, as anionic detergent, and the lipophile is an isoparaffin of 9 to 11 carbon atoms.

In FIG. 1 phase diagram 11 includes area 13 which defines the clear liquid crystal compositions, and area 15, which defines the turbid or lactescent liquid crystals. Area 17, defined by line 19 and the zero percent surfactantcosurfactant system line 21 is where the composition is an emulsion, dispersion or other plural phase type.

For illustration, the composition at point 23, marked by the X, is of 75% water, 20% surfactant-cosurfactant system and 5% paraffin (isoparaffin). When such composition is brought into contact with lipophilic soil and "absorbs it", in effect the paraffin or lipophile content at the interface is increased and the composition becomes a microemulsion, leaving the liquid crystal area of the phase diagram. In a related type of transformation of phases, the microemulsion identified by the location of the X at 25 of the phase diagram, which is a concentrated water-in-oil microemulsion, when diluted with two parts of water per part of the microemulsion, is transformed into a clear liquid crystal composition identified by the X at numeral 23. However, when the dilution of the concentrate is with only one part of water per four parts of concentrate the composition resulting is a turbid liquid crystal, of the formula defined by location 27. By further dilutions of such liquid crystal with water other such turbid liquid crystal compositions can be produced, as well as other transparent liquid crystal compositions, up to and beyond the composition indicated at 23. Subsequent dilution of the clear liquid crystal will convert it to microemulsion form and ultimately to other plural phase form.

Figure 2:
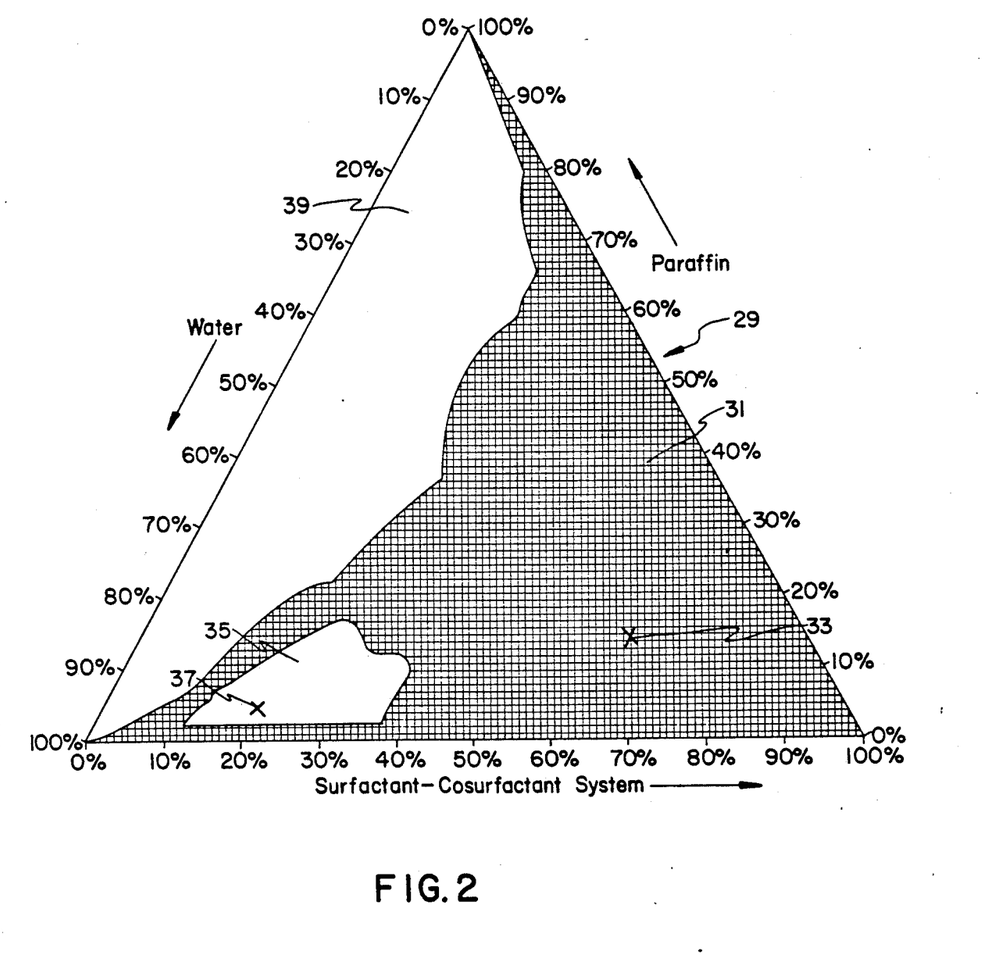
FIG. 2 is a related phase diagram wherein the cosurfactant is propylene glycol n-butyl ether.

In FIG. 2 phase diagram 29 is shown to include cross-hatched microemulsion area 31, in which is located a concentrated composition at a location marked by an X, which location is identified by numeral 33. Also shown is white liquid crystal area 35, in which is located a preferred liquid crystal composition of the invention at the X identified by numeral 37. An emulsion (or non-microemulsion and non-liquid crystal) area 39, which is also white in the figure, is also identified. The microemulsion concentrate composition 33, upon dilution with two parts of water per part of composition, is converted to the liquid crystal 37. Similar phase diagrams, like those of FIG's. 1 and 2, may be drawn for other three-member compositions comprising water, lipophile and surfactant-cosurfactant systems within the invention and each will include liquid crystal, microemulsion and "other phases" areas.

In the previous description of the components of the invented compositions and proportions thereof which may be operative, boundaries were drawn for preferred compositions within the invention but it will be evident that one seeking to manufacture the invented liquid crystal compositions and concentrates that produce them upon dilution with water will select proportions of components indicated by the phase diagrams for the particular compositions, so that the desired compositions will be within the liquid crystal area and the concentrates will be such that dilution with water will result in compositions within the liquid crystal area. Similarly, the compositions selected should be such that upon contact with lipophilic soil to be removed from a substrate the interface composition will be a microemulsion, rather than an "ordinary" emulsion, for best soil removal activity. Thus, for example, reference to FIG. 1 indicates that the microemulsion will be more readily formed when the liquid crystal composition contacts the lipophilic soil if the liquid crystal is of a composition on the lower left side of the clear liquid crystal area, rather than at the upper right portion thereof.

For plotting of the phase diagrams and in experiments undertaken by the inventors to establish the formulas of the desired liquid crystal compositions many different compositions within the invention were made and were characterized, by observations of certain properties, as clear liquid crystals, turbid liquid crystals, microemulsions or "others" and on the bases of such observations the phase diagrams were drawn, either by hand (FIG. 1) or by computer (FIG. 2).

A composition of this invention is in a liquid crystal state when it is of lyotropic structure, is transparent or slightly turbid (lactescent) but not opaque, and has a storage modulus equal to or higher than one Pascal (1 Newton/sq. m.), when measured at a temperature of 25° C., at a frequency of ten radians per second and a strain of 0.01. The rheological behavior of such composition is measured by means of a Rheometrics Fluids Spectrometer 8400, manufactured by Rheometrics Company, Piscataway, New Jersey. In making the measurement, using the coaxial cylinders, the inner cylinder, which is fixed, is of a radius of 16 mm. and a height of 32 mm., and the outer cylinder, which is mobile, is of a radius of 17 mm.

The storage modulus for the compositions of Examples 1 and 2, as identified in FIG's. 1 and 2, is 2.7 Pascals. The preferred clear lyotropic liquid crystal of the invention is of undulating lamellae, with a correlation length below 1,000 Å. The lamellar liquid crystalline phase may be regarded as a packing of soft wave shaped membranes. The system is composed of a succession of thin oil-containing layers that are separated by water layers, with surfactant at the interfaces of the layers.

It is desirable that the invented compositions do not contain components of the molecular weights above 5,000 but in some instances, as when the composition exhibits physical and cleaning properties that are very desirable in a successful pre-spotting agent, the presence of such higher molecular weight components may be tolerated. Also, sometimes enzymatic components may be employed which can be of molecular weights higher than 5,000, in some forms, and the importance of the enzymatic action in loosening soils and cleaning substrates counterbalances the disadvantages of the presence in the composition of the higher molecular weight material.

To make the liquid crystal compositions of the invention is relatively simple because they tend to form spontaneously with little need for the addition of energy to promote transformation to the liquid crystal state. However, to promote uniformity of the composition mixing will normally be undertaken and it has been found desirable first to mix the surfactants and cosurfactant with the water, followed by admixing of the lipophilic component, usually a hydrocarbon (but esters or mixtures of hydrocarbons and esters may also be employed). It is not necessary to employ heat and most mixings are preferably carried out at about room temperature (20-25° C.). The microemulsion concentrates, from which the liquid crystal compositions may be made by dilution with water, are also manufactured according to the same procedure and the liquid crystal compositions are made from the concentrates merely by dilution with water, accompanied by sufficient mixing to make the final product homogeneous.

Pre-spotting and cleaning uses of the invented liquid crystal detergent compositions are uncomplicated, requiring no specific or atypical operations. Thus, such compositions may be employed in the same manner as other liquid pre-spotting and detergent compositions. Because the transformation to microemulsion state from liquid crystal state by absorption of lipophilic soil is spontaneous and occurs at room temperature (and even at colder temperatures) it is not necessary to heat the liquid crystal compositions nor the substrate before application of the liquid crystal detergent (or pre-spotting agent) to the surface to be cleaned. The invented compositions may be applied to such surfaces by pouring onto them, by application with a cloth or sponge, or by various other contacting means but it is preferred to apply them in the form of a spray by spraying them onto the substrate from a hand or finger pressure operated sprayer or squeeze bottle. Such application may be onto hard surfaces, such as dishes, walls or floors, from which lipophilic (usually greasy or oily) soil is to be removed, or may be onto fabrics, such as laundry, which has previously been stained with lipophilic soils, such as motor oil. The invented compositions may be used as detergents and as such may be employed in the same manner in which liquid detergents are normally utilized in dishwashing, floor and wall cleaning and laundering, but it is preferred that they be employed as pre-spotting agents too, in which applications they are found to be extremely useful in loosening the adhesions of lipophilic soils to substrates, thereby promoting much easier cleaning with application of more of the same invented detergent compositions or by applications of different commercial detergent compositions, in liquid, bar or particulate forms. As was previously indicated, the liquid crystal compositions spontaneously convert to microemulsions upon contact with lipophilic soil and such microemulsion formation effectively weakens the bond of the soil to the substrate. After it is in the microemulsion the soil is readily transferred to aqueous washing or rinsing media, which makes it very easily removable from the substrate. The absorption of the lipophilic soil by the liquid crystal detergent composition is accompanied by a change in the nature of the composition. The liquid crystal detergent is of a greater viscosity and adhesion than is the microemulsion, to which it is converted by absorption of the lipophile. Thus, when sprayed onto a surface, such as a vertical wall, the present cleaning compositions adhere to it and do not run or drip excessively, thereby allowing the detergent to work on the lipophilic soil more effectively. When the transformation to microemulsion form has taken place a sign of it will be thinning of the product and running down of the microemulsion from the original locus of application. The thinning also facilitates removal of the detergent composition from the substrate by sponging, rinsing, etc. While the advantages of a thicker and more adhering liquid detergent composition are more significant for wall cleaning than for dishwashing, floor cleaning or laundering, even in the cases of such horizontal surfaces or surfaces which can be maintained horizontal, the applied liquid crystal detergent composition substantially remains at the locus of the lipophile and thereby is better able to perform its cleaning function.

The following examples illustrate but do not limit the invention. Unless otherwise indicated, all parts in these examples, in the specification and in the appended claims are by weight and all temperatures are in ° C.

EXAMPLE 1

| Component | Percent |
|---|---|
| *Dobanol ® 91/5 (Shell) | 9.88 |
| **Dobanol 91/2.5 (Shell) | 2.47 |
| Tripopylene glycol n-butyl ether | 7.00 |
| ***Aerosol ® OT 100 (Cyanamid) | 0.65 |
| Water, deionized | 75.00 |
| ****Isopar ® H (Exxon) | 5.00 |
| | 100.00 |

*$C_{9-11}$ fatty alcohol condensed with 5 moles of ethylene oxide per mole
**$C_{9-11}$ fatty alcohol condensed with 2.5 moles of ethylene oxide per mole
***Di(2-ethylhexyl) sodium sulfosuccinate
****$C_{10-11}$ isoparaffin The above composition and corresponding compositions in which the tripropylene glycol n-butyl ether is replaced by dipropylene glycol n-butyl ether and propylene glycol n-butyl ether are made by mixing together the nonionic surfactants, dissolving them in the water or a portion of the water, dissolving the anionic surfactant in the aqueous nonionic surfactant solution or in another portion of the water, mixing together such aqueous portions if separate dissolvings were practiced, admixing the cosurfactant with the aqueous surfactant solution and finally, admixing the lipophile with the balance of the composition. Such formulation is done at room temperature (25° C.) and is effected in a short time, such as 5 to 10 minutes. The result is a clear liquid crystal detergent composition of the formula of the X identified by numeral 23 in FIG. 1 (when tripropylene glycol n-butyl ether is the cosurfactant). When propylene glycol n-butyl ether is the cosurfactant the composition is within the liquid crystal area of the phase diagram of FIG. 2, with the point indicated by numeral 37 identifying it.

The compositions made, all of which are in clear liquid crystal form, are tested for soil removal properties (cleaning effectiveness) in pre-spotting and washing applications against soils that are present on hard surfaces, such as tile walls and dishes, and on fabrics, such as soiled laundry, and are compared to commercial liquid detergents and pre-spotting agents for cleaning actions. In the following laboratory tests the invented compositions are compared to commercial liquid and paste pre-spotting agents and to unbuilt liquid detergent compositions. For hard surface treatments, to simulate cleanings of soils from walls, such as tile and Formica ® walls, and tile and linoleum floors, three tests were run. In the first of these white Formica tiles are uniformly sprayed with a chloroform solution of a mixture of hardened tallow, beef tallow and oil soluble red dye, and such soil is allowed to dry to room temperature for thirty minutes before inception of the test. Then, five gram samples of each of the test compositions are weighed out into pre-wet sponges which have been wrung out to remove any excess water, and the cleaning actions of the products are tested on the described soiled tiles by utilization of a machine which moves the sponge over the tiles and counts the strokes required to clear a path through the soil to the tile surface. The invented compositions take ten strokes and commercial products take 25 to 40 strokes, e.g., 33 strokes. From past experience a five stroke difference is significant so in the present case the difference found is more than four times that significant number, showing that the invented compositions are very much better in cleaning hard surfaces stained with fatty material (animal fats).

The second test employed is a pre-spotting type application of the cleaning compositions to white enamel tile surfaces onto which there have been brushed chloroform solutions of tar. In such tests 2.5 grams of a 10% tar solution is painted onto each tile surface and is allowed to dry to room temperature for five minutes. 0.5 Gram of each of the test compositions is applied to different sections of the tile and allowed to remain in contact therewith for one minute, after which the tile is rinsed under cold (15° C.) tap water and the extents of tar removals are noted. The invented liquid crystal compositions remove all the tar but the commercial liquid detergents do not remove any of it, in these tests. In the third set of experiments white enamel tiles are painted with a solution of used motor oil, linseed oil, hardened tallow and varnish in petroleum ether and the soil coating is baked onto the tiles in an oven at 300° C. for ten minutes. 0.5 Gram of each of the test compositions is then weighed out onto the soiled tiles and such compositions are allowed to remain in contact with the soils for thirty minutes, after which they are rinsed off under cold tap water and soil removal is visually evaluated. In such tests the same results are obtained as in the second set of tests, with the invented compositions being far superior to the commercial preparations.

In another set of hard surface treatment experiments, intended to simulate removals of soils from dishes, five different types of soils are prepared, painted onto dishes and baked onto them. The soils are: a burnt fatty soil, comprising peanut oil, corn oil, meat (beef) extract and ground cherries; burnt milk; vermicelli with cheese; mashed potatoes; and burnt cream sauce. Such soils are applied to Pyrex ® dishes, stainless steel pans, glass pans, enamelled pans and Pyrex dishes, respectively. The various compositions are applied to the different soils and allowed to stand on them for periods from 30 minutes to an hour, with the "standing times" being the same for each comparison. Then the substrates are subjected to rinsing with water and sometimes are subjected to light sponging, but again, the various treatments are conducted under the same conditions so as to be comparative and meaningful. The rinsed items are then allowed to dry, are observed, and soil removals are comparatively estimated by a panel of observers. In all cases the invented products are found to be better in soil removal and the panel significantly prefers them over commercial liquid detergents applied either in neat (100%) or 20% aqueous solution form.

The invented liquid crystal detergent compositions are compared to a commercial pre-spotting agent in paste form, which contains more synthetic organic detergent, and also contains builder salt (sodium tripolyphosphate). Different cotton swatches are stained with EMPA soil (vegetable oil and dust), Spangler soil (animal and vegetable oils and fats), wine, tomato sauce, cherries, chocolate ice cream, blood and dirty motor oil. The soils are applied to cotton swatches and the swatches are dried at 180° C. before use. Before beginning the cleaning tests, the swatches are read on a reflectometer and similar Rd readings are taken at the completions of the tests. The pre-spotting operations involve applying two grams of each neat product onto the swatches, leaving the products in contact with the soiled swatches for 30 minutes, rinsing and drying, after which the swatches are again read, using the reflectometer From such readings the percentages of soil removals are calculated. It is found that the invented liquid crystal detergent composition, without builder salt and with less detergent content than the paste pre-spotting agent, is equivalent to it or better in removing all stains except blood, in which the commercial pre-spotter is significantly better, but the invented compositions are better than the commercial agent in removing fruit stains (cherries).

In addition to the laboratory experiments, practical use test comparisons with commercial liquid detergents and pre-spotting agents are undertaken by applying the same weights of experimental and the comparative products to dirty painted wall surfaces, from which the products are lightly sponged after one minute and after three minutes. In such cases the invented liquid crystal detergent compositions adhere better to the wall than do the other products, when the same weights of all are sprayed onto the wall, using a hand sprayer, and the removals of the soils are noticeably better using the experimental products. The experimental products do not run soon after applications, as do the comparative products, although they do thin out after changing to microemulsion form, which signals that cleaning has been effected.

In practical dishwashing and laundering tests the experimental and comparative pre-spotting liquid detergent products are applied by spraying onto dirty dishes and onto soiled laundry, at the loci of the soils, after which they are allowed to stay on such surfaces for five minutes and are then washed, using commercial dishwashing liquid or liquid laundry detergent, respectively. In such instances the soil removals are better when the experimental products are utilized as pre-spotting agents. Similar results are obtainable when instead of employing commercial products for the washing operations, the experimental products are used instead.

The results reported above are also obtainable when the experimental compositions include functional and aesthetic adjuvants, such as preservatives, perfumes and colorants, for example 0.08% of formalin, 0.45% of perfume and 0.008% of dye, and when NRE's replace BRE's as nonionic detergents.

EXAMPLE 2

| Component | Percent |
|---|---|
| Dobanol 91/5 | 29.6 |
| Dobanol 91/2.5 | 7.4 |
| Sodium dioctyl sulfosuccinate | 2.0 |
| Tripropylene glycol n-butyl ether | 21.0 |
| $C_{10-11}$ isoparaffin | 15.0 |
| Water, deionized | 25.0 |
| | 100.0 |

The above described liquid crystal detergent composition is a clear water-in-oil microemulsion detergent that is made by mixing the components thereof in the same manner as described in Example 1. Such microemulsion, like the other microemulsions resulting from employments of the invented liquid crystal compositions, is dilutable with room temperature water (and even cold water). In tests like those reported in Example 1 it also performs exceptionally well, being an acceptable laundry pre-spotter and being far superior to liquid dishwashing detergent compositions and other liquid detergent compositions commercially employed for cleaning walls, floors, tiles and dishes.

EXAMPLE 3

Concentrates of the formulas represented by points 25 (FIG. 1) and 33 (FIG. 2) are made in the manner described in Example 1 and are converted by dilution with water to liquid crystal detergent compositions of the formulas described by points 27 and 23 (FIG. 1) and 37 (FIG. 2), respectively. Of course, for the FIG. 2 formulas propylene glycol n-butyl ether is substituted for the tripropylene glycol n-butyl ether of the FIG. 1 formula. If desired, the concentrate formulas of points 27 and 33 are employed directly as prespotting agents or as detergent compositions, with satisfactory results but it is usually preferred to dilute them to liquid crystal form before use.

EXAMPLE 4

Variations of the preceding working example formulas may be made in which the proportions of components are adjusted ±10, ±20 and ±30%, while remaining within the ranges given in the specification, and essentially the same desirable pre-spotting and cleaning results are obtainable. Similarly, there may be substituted for the indicated nonionic detergents, anionic surfactant, cosurfactant and lipophile, other such compounds, as set forth in the specification, such as Neodol ® 25-3, potassium dihexyl sulfosuccinate, triethylene glycol isobutyl ether and n-decane and/or methyl cocate. Mixtures of the various individual components may also be employed in some cases to produce optimum results. Although usually builder salts will be omitted from the present formulations, so as to make the products useful for pre-spotting and washing of dishes, as well as laundry and wall and floor surfaces, for those products not intended for hand dishwashing applications such builder salts may be present, such as sodium tripolyphosphate and sodium carbonate, so long as they do not interfere with the desirable liquid crystal state of the product and the spontaneous transformation of such product to microemulsion state in use. The builder content will usually be held to no more than 10%, preferably to no more than 5%.

The various advantages of the invention have already been set forth in some detail and will not be repeated here. However, it will be reiterated that the invention relates to the important discovery that effective liquid detergent compositions can be made in the liquid crystal state and that because they are in such state they are especially effective in removing lipophilic soils from substrates and also are effective in removing from substrates non-lipophilic soils which are bound to the substrates by lipophilic materials. Such desirable properties of the liquid crystal detergent compositions of this invention make them ideal for use as pre-spotting agents and detergents for removing hard-to-remove soils from substrates in various hard and soft surface cleaning operations. Especially important is the spontaneous conversion of the invented compositions to microemulsion form, during which conversion lipophilic soil is loosened and absorbed from the soiled substrate without the need for applications of significant amounts of energy, either in thermal or mechanical form. Thus, the invention is a significant one and represents an important technical advance in the art.

The invention has been described with respect to various embodiments and illustrations of it but is not to be considered as limited to these because it is evident that one of skill in the art with the present specification before him or her will be able to utilize substitutes and equivalents without departing from the invention.

What is claimed is:

1. A liquid detergent composition which is suitable for room temperature pre-treating and cleaning of materials soiled with lipophilic soil, and which is in liquid crystal form or is capable of being diluted with water and thereby being converted to liquid crystal form, which comprises about 5 to 40% of surface active agent, which is a mixture of nonionic and anionic detergents wherein the anionic detergent is a $C_{4-12}$ alcohol ester of a sulfosuccinic acid salt, about 0.5 to 20% of a cosurfactant which is a lower alkylene glycol lower alkyl ether, with the proviso that the amount of cosurfactant is about 10 to 50% of the sum of the amounts of surfactant and cosurfactant, the sum of the surfactant and cosurfactant amounts is about 5 to 60% of the liquid detergent composition and the amount of the alcohol ester of sulfosuccinic acid salt is in the range of about 2 to 25% of the amount of nonionic detergent present, about 1 to 20% of lipophilic solvent selected from a group consisting of a hydrocarbon, an ester of a higher alcohol and a lower carboxylic acid, an ester of a lower alcohol and a higher carboxylic acid, or mixture thereof, and about 40 to 90% of water, which liquid detergent composition is free of non-enzymatic materials of molecular weight greater than 5,000, is in liquid crystal form, is sprayable by a hand operated pump sprayer, the sprayed composition is adherent to vertical surfaces and spontaneously forms a microemulsion when it is brought into contact with lipophilic soil, which microemulsion is of a lower viscosity than the liquid crystal detergent composition.

2. A liquid detergent composition according to claim 1 wherein the nonionic detergent is a condensation produce of higher fatty alcohol and lower alkylene oxide, the cosurfactant is of 3 to 9 carbon atoms and includes a hydroxy radical, and the lipophilic solvent is a saturated hydrocarbon of 7 to 13 carbon atoms, methyl cocate or a mixture thereof.

3. A liquid detergent composition according to claim 2 wherein the nonionic detergent is a condensation product of a mole of higher fatty alcohol of 8 to 12 carbon atoms with 2 to 6 moles of ethylene oxide, and the lipophilic solvent is a paraffin of 8 to 12 carbon atoms.

4. A liquid detergent composition according to claim 3 wherein the proportions of components are about 6 to 35% of the nonionic detergent, about 0.3 to 5% of the $C_{4-12}$ alcohol ester of the sulfonsuccinic acid salt, about 4 to 12% of a cosurfactant amphiphile of 3 to 9 carbon atoms which includes a hydroxy radical, with the proviso that the cosurfactant content is about 25 to 45% of the sum of the amounts of surfactant and cosurfactant and that such sum is about 10 to 45% of the liquid detergent composition, about 2 to 10% of the paraffin and about 50 to 85% of water.

5. A concentrated liquid detergent composition which is not a liquid crystal but which, on dilution with water, not exceeding three parts of water per part of composition, forms a liquid crystal according to claim 1.

6. A concentrated liquid detergent composition according to claim 5 which comprises about 12.5 parts of nonionic detergent which is a condensation product of one mole of higher fatty alcohol of 9 to 11 carbon atoms with 2 to 6 moles of ethylene oxide, about 0.7 part of sodium $C_{6-10}$ dialkyl sulfosuccinate, about 7 parts of tripropylene glycol lower alkyl monoether, wherein the lower alkyl is of 3 to 6 carbon atoms, about 5 parts of a paraffin of an average of 9 to 11 carbon atoms and up to 50% of the concentrated composition of water.

7. A process for making a liquid crystal detergent composition which comprises mixing together up to three parts by weight of water with one part by weight of a concentrated liquid detergent composition of claim 5, with the amount of water employed being such that the final composition is in liquid crystal state.

8. A process for treating materials soiled with lipophilic soil to loosen or remove it which comprises applying to the locus of such soil on such material a soil loosening or removing amount of a composition according to claim 1.

9. A process according to claim 8 wherein the composition is applied as a pre-treatment to material soiled with hard-to-remove lipophilic soil at the locus thereof on the material, after which application the soil is removed by application of the same or a different detergent composition and water.

10. A process according to claim 9 wherein the composition is applied as a pre-treatment onto dishes having deposits of animal fat thereon before hand washing of such dishes in dishwater containing a dishwashing detergent composition.

11. A process according to claim 9 wherein the composition is applied as a pre-spotting treatment onto laundry soiled with oily or greasy soils at the loci of such soils before washing of the laundry in wash water containing a laundry detergent composition.

12. A process for absorbing a lipophilic soil from a surface into a liquid crystal detergent composition and converting such liquid crystal detergent composition to a thinner microemulsion which comprises applying a liquid crystal detergent composition of claim 1 to the lipophilic soil on the surface, whereby the soil is absorbed into the detergent composition and the composition is converted to a microemulsion, which is of lower viscosity than the liquid crystal composition and is readily removable from the surface.

13. A process according to claim 12 wherein the liquid crystal detergent composition is sprayed onto the lipophilic soil on the surface, on which it remains as a surface adherent liquid until the lipophilic soil is absorbed by it, at which point it is converted to thinner microemulsion form, signalling that the lipophilic soil may be removed, and washing off the microemulsion of the detergent composition and the lipophilic soil with water or aqueous detergent solution.

14. A liquid detergent composition, which is suitable for room temperature pre-treating and cleaning of materials soiled with lipophilic soil, and which is in liquid crystal form or is capable of being diluted with water and thereby being converted to liquid form, which comprises about 6 to 35% of a nonionic detergent which is a condensation product of a mole of higher fatty alcohol of an average of 9 to 11 carbon atoms with 2 to 6 moles of ethylene oxide, about 0.3 to 5% of a $C_{6-10}$ alcohol diester of a sulfosuccinic acid salt wherein the alcohol is saturated and branched, about 4 to 12% of a cosurfactant which is a mono-, di- or tri-propylene glycol lower alkyl ether wherein the lower alkyl is of 3 to 6 carbon atoms, with the proviso that the cosurfactant content is about 25 to 45% of the sum of the amounts of nonionic detergent, anionic detergent and cosurfactant, and that such sum is about 10 to 45% of the liquid detergent composition, about 2 to 10% of a paraffin which averages 9 to 11 carbon atoms, and about 50 to 85% of water, which liquid detergent composition is free of non-enzymatic materials of molecular weight greater than 5,000, is in liquid crystal form, is sprayable by a hand operated pump sprayer, the sprayed composition is adherent to vertical surfaces and spontaneously forms a microemulsion when it is brought into contact with lipophilic soil, which microemulsion is of a lower viscosity than the liquid crystal detergent composition.

15. A process for treating material soiled with lipophilic soil to loosen or remove it which comprises applying to the locus of such soil on such material a soil loosening or removing amount of a composition according to claim 14.

16. A process according to claim 15 wherein the composition is applied as a pre-treatment on materials soiled with hard-to-remove lipophilic soil at the locus thereof on the material, after which application the soil is removed by application of the same or a different detergent composition and water.

17. A process according to claim 16 wherein the composition is applied as a pre-treatment onto dishes having deposits of animal fat thereon before washing of such dishes in dishwater containing a dishwashing detergent composition.

18. A liquid detergent composition according to claim 14 wherein the nonionic detergent is a condensation product of a mole of higher fatty alcohol of an average of 9 to 11 carbon atoms with an average of about 2.5 to 5 moles of ethylene oxide, the anionic detergent is sodium dioctyl sulfosuccinate, the cosurfactant is tripropylene glycol butyl ether or dipropylene glycol butyl ether, the paraffin is an isoparaffin of an average of 10 to 11 carbon atoms, and the composition contains no material of molecular weight above 5,000 and is at a pH in the range of 6 to 8.

19. A liquid detergent composition according to claim 18 which comprises about 10% of a nonionic detergent which is a condensation product of one mole of higher fatty alcohol of an average of 9 to 11 carbon atoms with about five moles of ethylene oxide, about 2.5% of a nonionic detergent which is a condensation product of one mole of a higher fatty alcohol of an average of 9 to 11 carbon atoms with about 2.5 moles of ethylene oxide, about 0.7% of sodium di-(ethylhexyl) sulfosuccinate, about 7% of tripropylene glycol n-butyl monoether, about 5% of isoparaffin averaging 10 to 11 carbon atoms, and about 75% of water, which composition contains no material of molecular weight above 1,000, and is of a pH of about 7.

* * * * *